United States Patent [19]

Spillman, Jr.

[11] Patent Number: 4,712,004
[45] Date of Patent: Dec. 8, 1987

[54] METHOD AND APPARATUS FOR COMPENSATING FIBER OPTIC LEAD AND CONNECTOR LOSSES IN A FIBER OPTIC SENSOR BY USING A BROADBAND OPTICAL SOURCE AND MULTIPLE WAVE RETARDATION

[75] Inventor: William B. Spillman, Jr., Charlotte, Vt.

[73] Assignee: Simmonds Precision Products, Inc., Tarrytown, N.Y.

[21] Appl. No.: 898,318

[22] Filed: Aug. 20, 1986

[51] Int. Cl.⁴ .................................................. H01J 5/16
[52] U.S. Cl. .................................... 250/227; 250/225; 250/231 R; 250/231 P; 73/800
[58] Field of Search ............... 250/227, 231 R, 231 P, 250/225; 324/96; 350/96.29; 73/705, 800

[56] References Cited

U.S. PATENT DOCUMENTS

| | | | |
|---|---|---|---|
| 4,290,146 | 9/1981 | Adolfsson et al. | |
| 4,321,831 | 3/1982 | Tomlinson et al. | |
| 4,368,645 | 1/1983 | Glenn et al. | 73/705 |
| 4,442,350 | 4/1984 | Rashleigh | 250/227 |
| 4,493,995 | 1/1985 | Adolfsson et al. | 250/227 |
| 4,514,860 | 4/1985 | Adolfsson et al. | 455/612 |
| 4,515,473 | 5/1985 | Mermelstein | |
| 4,519,252 | 5/1985 | McMahon | |
| 4,523,092 | 6/1985 | Nelson | 250/231 R |
| 4,564,755 | 1/1986 | Winzer et al. | 250/227 |
| 4,644,153 | 2/1987 | Ida | 250/227 T |

OTHER PUBLICATIONS

Spectral Linewidth Dependence of Photoelastic Sensor Performance, Spillman, Patriquin and Kline–1985.
Multimode Fiber Optic Sensors Based on the Photoelastic Effect, Spillman and McMahon–1983.

Primary Examiner—Edward P. Westin
Assistant Examiner—Jessica L. Ruoff
Attorney, Agent, or Firm—Cushman, Darby & Cushman

[57] ABSTRACT

Method and apparatus for compensating a phototransducer system for fiber optic transmission losses and optical source power fluctuations includes generating a broadband source light beam having a plurality of spectral components. The source light beam is transmitted to a polarizer which polarizes the light beam and directs it to a multiple wave retardation device. The retardation device retards the spectral components of the polarized light beam. The retarded light beam is injected into a photoelastic transducer which modulates the polarizations of the retarded light beam in accordance with pressure applied to the transducer. Each spectral component of the retarded light beam will be modulated by the transducer. However, the broadband light beam will remain, in sum, relatively invariant to the applied pressure. The modulated light beam is then passed through an analyzer, injected into a fiber optic cable, and transmitted to a beam splitter. The beam splitter provides a first light beam to a photodetector which detects the light intensity of all spectral components, which intensity is only affected by transmission losses and power fluctuations within the system. A second portion of the split light beam is passed through a narrow passband filter which passes only certain portions of the spectral components which do vary with the applied pressure and transmission losses and power fluctuations. The filtered signal is detected by a second photodetector. The photodetectors provide electrical signals to a processor which outputs an electrical signal corresponding to a ratio of the first and second electrical signals.

27 Claims, 14 Drawing Figures

METHOD AND APPARATUS FOR COMPENSATING FIBER OPTIC LEAD AND CONNECTOR LOSSES IN A FIBER OPTIC SENSOR BY USING A BROADBAND OPTICAL SOURCE AND MULTIPLE WAVE RETARDATION

BACKGROUND OF THE INVENTION

This invention relates to the field of fiber optic sensor systems, and more particularly to the field of compensating such systems for fiber optic lead and connector losses and power fluctuations of the optical source.

Fiber optic technology has been growing at an ever expanding rate. With the advance in fiber optic technology, the adaptation of optical devices to sensing systems is becoming more widespread. For example, fiber optic sensors have been proposed to detect such phenomena as acoustic waves, rotation rates, acceleration, pressure, magnetic and electrical fields, temperature, and stress and strain, etc. However, a problem inherent in all such fiber optic sensing systems is that the optical signal is greatly attenuated by the fiber optical cable itself and its connectors. In addition, power fluctuations in the optical source may also obscure many usable signals from such a device. Thus, detecting and precisely measuring an applied pheomenon is very difficult, severely restrictng the uses to which a fiber optic sensor may be applied.

Figure 1:
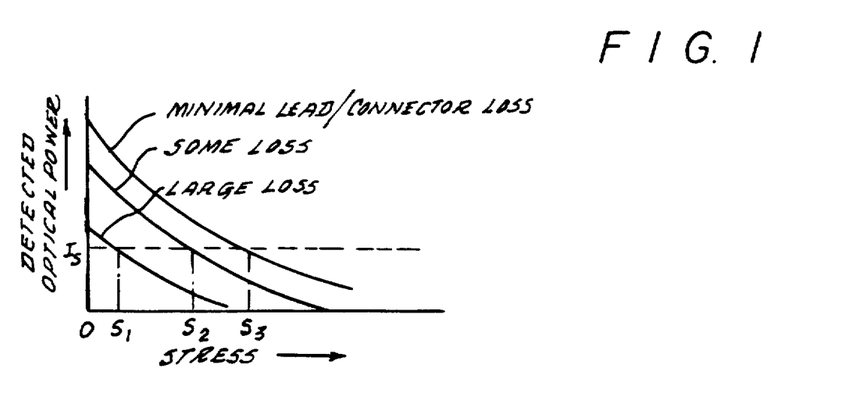
FIG. 1 depicts the effect of fiber optic lead/connector loss on the detected optical power of known photosensor systems.

FIG. 1 depicts the relationship between detected optical power and an applied phenomenon (stress) in known fiber optic sensor systems. Where the detected light intensity is $I_s$, it is unknown whether this detected intensity corresponds to a stress level $S_1$, $S_2$, or $S_3$. This is because the amount of lead and connector losses in the fiber optic cable system may vary from slight to extreme. The detected signal is difficult to correlate with a given stress level. Such an uncertainty is often fatal to a proper application of such fiber optic sensor systems.

One solution to this problem is proposed in U.S. Pat. No. 4,368,645 to Glenn et al. Glenn et al discloses an optical pressure sensor which can compensate for some (but not all) lead/connector losses and light source power fluctuations. The device according to Glenn et al provides a light source which generates a light beam that is input into a fiber optic cable. The fiber optic cable directs the source light beam to a lens which collimates the light beam. The collimated light beam is then passed through a linear polarizer and a quarter wave plate to circularly polarize the collimated light beam. The circularly polarized light beam is then introduced into a photo transducer which modulates the polarized light beam in accordance with pressure applied to the photo transducer. The modulated light beam is then directed to a polarizing beam splitter which splits the modulated light beam into first and second components. Each separate component is focused by a lens into a separate fiber optic cable. These fiber optic cables then direct the first and second components to photo detector devices for detecting the intensity of the first and second components. The dependence of the intensities of the two components on the pressure applied to the photoelastic transducer permits the measurement of that pressure in a manner that has quadratic error dependence on optical misalignment. The difference in the intensities of the two components is then divided by the sum of the intensities of the two components to eliminate lead/connector losses in the fiber optic cable leading up to the transducer. However, such a scheme does nothing to accommodate for lead/connector losses from the output of the transducer to the photo detector devices. Thus, the device according to Glenn et al is still highly susceptible to fiber optic lead/connector losses. If such losses in the output fiber optic cables are significant, the device according to Glenn et al will not function properly.

Another solution for compensating the sensitivity variations in fiber optic cable damping and the drift of the light source and photo detectors is proposed in U.S. Pat. No. 4,493,995 to Adolfsson et al. In Adolfsson et al, an optical source provides a source light beam at a single wavelength which is used as a carrier wave. This carrier wave is then modulated at one or more lower frequencies in accordance with the phenomenon sensed by the photo transducer. The material in the photo transducer responds differently depending upon the modulation frequency of the light beam, not upon the carrier frequency (wavelength) itself. The response of the photo transducer material at the different modulation frequencies can then be used to determine the sensed phenomenon independently of lead and connector losses. However, such a device is complex and expensive due to the necessity of modulating the carrier wave. In addition, demodulation electronics are required, also increasing the complexity and cost of this device.

Therefore, what is needed is an inexpensive yet precise solution to compensating photo sensor systems for fiber optic lead/connector losses and fluctuations in the light source.

SUMMARY OF THE INVENTION

The present invention provides an inexpensive fiber optic sensing device which can provide a very precise measurement of a detected phenomenon without suffering losses due to fiber optic lead/connector attenuation, and without uncertainty due to power fluctuations in the optical source.

The present invention provides method and apparatus in which a light source provides a broadband source light beam having a plurality of spectral components, each spectral component having a different wavelength. The source light beam is transmitted to a polarization-multiple wavelength retardation-transducer device, usually through at least one fiber optic cable.

The polarization-multiple wavelength retardation-transducer device receives the source light beam, polarizes it, retards the plurality of spectral components in the polarized light beam, modulates the retarded light beam in accordance with the externally applied phenomenon, and analyzes the modulated light beam to provide an output light beam having a light intensity which, overall, is effectively unresponsive to the externally applied phenomenon even though individual spectral components do vary in accordance with the phenomenon.

The light beam output from the polarization-multiple wavelength retardation-transducer is then transmitted to a filter device, usually through additional fiber optic cables. The filter device may include a beam splitter which splits the output light beam into first and second portions. The first portion is provided to a narrow passband filter which passes only one of the spectral components of the output light beam. This one spectral component is one which varies in accordance with the detected phenomenon. The filtered signal is then provided to a photodetector which detects the light intensity of the spectral component as it varies with the detected phenomenon.

Meanwhile, the second portion of the split output light beam is provided directly to a second photodetector which detects the light intensity of this second portion. This portion contains all spectral components of the output light beam, and thus, as a whole, remains substantially unresponsive to the detected phenomenon. The first and second photodetectors then provide electrical signals which correspond to the intensities of the first and second portions of the split light beam, respectively. These electrical signals are then provided to a processing device which provides an output signal corresponding to a ratio of the first and second electrical signals.

In such a fashion, the output electrical signal will vary in accordance with the phenomenon detected by the optical transducer, while remaining substantially unaffected by signal attenuation in the fiber optic cabling and connectors, and power fluctuations of the optical source.

In a preferred embodiment, the polarization-multiple wavelength retardation-transducer means includes a polarizer disposed to receive the source light beam, a multiple wavelength retardation device which may include a plurality of retardation plates, a photoelastic transducer which modulates the polarizations of the light beam in accordance with the detected phenomenon, and an analyzer which provides an output light beam having spectral components with light intensity modulations.

BRIEF DESCRIPTION OF THE DRAWINGS

The advantages and features of the present invention will become more readily apparent with reference to the following detailed description of the presently preferred exemplary embodiment when taken together with the attached drawings which show.

DETAILED DESCRIPTION OF THE PRESENTLY PREFERRED EXEMPLARY EMBODIMENT

In brief, the present invention is a technique for use with fiber optic sensors that utilize transducer mechanisms incorporating optical retardation. The essence of the technique is to utilize a broadband optical source to inject light through the optical fiber and transducer. The wavelength range of the optical source will cause retardation effects that vary according to wavelength. An optical source with enough spectral width will result in a "zero sum" effect, i.e. averaged over all wavelengths, the light intensity of the light beam output from the analyzer will remain substantially unresponsive to the detected phenomenon. If the sensor optical output is divided so that one detected signal is proportional to the total broadband transmission while the other detected signal is passed through a narrow passband filter matched to the transducer optics, then the ratio of the signals will vary due to the transducer mechanism, but will be relatively insensitive to losses in the fiber optic leads and power fluctuations in the broadband optical source. In such a manner, an inexpensive fiber optic sensor can provide very precise measurements of the detected phenomenon without attenuation due to fiber optic cable and connector losses, or drift in the optical source.

The present invention is one solution to the problem of compensating an optical measuring system for fiber optic lead/connector losses. Another solution is proposed in my co-pending application Ser. No. 898317, filed concurrently herewith and entitled METHOD AND APPARATUS FOR COMPENSATING FIBER OPTIC LEAD AND CONNECTOR LOSSES IN A FIBER OPTIC SENSOR BY USING A DUAL WAVELENGTH OPTICAL SOURCE AND MATCHED POLARIZER.

The present invention will be described with respect to a photosensor system for detecting pressure. However, it is to be understood that the teachings of this application are applicable to photosensor systems for detecting acoustic waves, rotation rates, acceleration, pressure, magnetic and electric fields, temperature, stress and strain, and any other phenomenon capable of detection with fiber optic sensors. Thus, the teachings according to this application should be thought of as covering a broad range of fiber optic sensor applications.

The presently preferred embodiment makes use of a photoelastic transducer which modulates a light beam passing therethrough in accordance with a phenomenon applied to the photoelastic material. Such photoelastic transducers are known in the art, as described in the article entitled "Multimode Fiber Optic Sensors Based On The Photoelastic Effect", authored by the present inventor and D. J. McMahon. This article was presented at the SPIE Technical Symposium East, in Arlington, Va. in April of 1983. This article is specifically incorporated into this patent application by reference.

Photoelasticity is a phenomenon of stress (or strain) induced birefringence in optically transparent materials. Many of these materials are isotropic in the unstressed case. When a uniaxial stress is applied, however, a difference in index of refraction is introduced between the stress direction and directions orthogonal to it. The materials, therefore, exhibit a birefringence which depends on applied stress and they can be thought of as retardation plates whose retardation depends upon the amount of uniaxial stress applied thereto.

The present invention uses a broadband optical source in conjunction with a specially constructed photoelastic fiber optic transducer that uses multiple wave retardation as part of the transducer signal conditioning. Stress applied to the photoelastic element affects different wavelength components of the source (carrier) signal in different ways so that although each of the components varies considerably as stress is applied to the element, the sum of the components remains constant. At the sensor detector, the light returned from the photoelastic transducer is separated into two parts. The first part representing the total of the source components is converted to an electrical signal by a photodiode or other detector. The second part is filtered allowing only a single component of the broadband source to reach the second detector. The second signal varies according to lead and connector losses, power fluctuations of the optical source, and the stress modulation of the photoelastic element. The first signal varies only according to lead and connector losses and optical source power fluctuations. Therefore, the ratio of the second signal to the first signal provides a measure of the changes in transmission due to modulation of the transducer element, with lead and connector losses and optical source drift cancelling out.

The general theory of using a broadband optical source together with multiple wave retardation is described in an article entitled "Spectral Line Width Dependence Of Photoelastic Sensor Performance" authored by the inventor, D. R. Patriquin, and B. R. Kline. This article was published in SPIE Volume 566, Fiber Optic and Laser Sensors III (1985) at pages 141-146. The teachings of this article are hereby incorporated into this application by reference.

Figure 2:
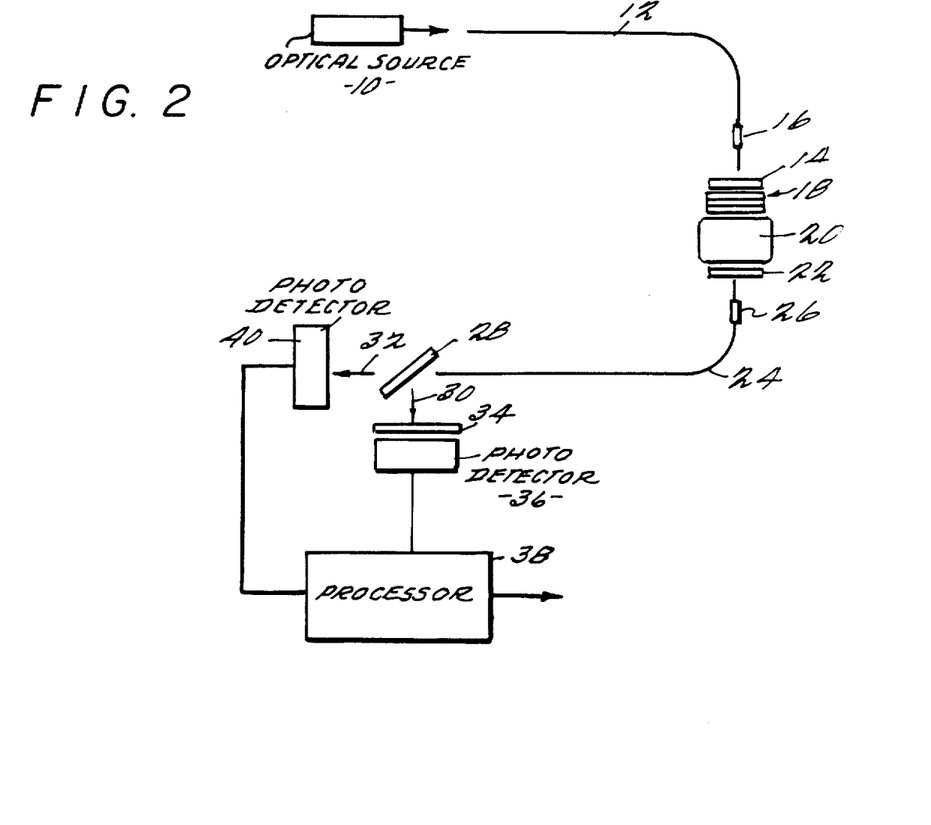
FIG. 2 depicts one embodiment of the apparatus according to the present invention.

FIG. 2 depicts a first embodiment according to the present invention. In FIG. 2, a broadband optical source 10 provides a source light beam having a broad wavelength band. For example, it has been determined that a wavelength band of greater than 100 nanometers provides a sufficiently broadband source light beam for the presently preferred embodiment.

The source light beam is injected into fiber optic cable 12 where it is transmitted to polarizer 14. Fiber optic cable 12 may actually include a number of fiber optic cables and fiber optic connectors 16, depending on the particular sensor application. The source light beam suffers attenuation due to the fiber, the fiber optic connectors 16, and other optical components which may be attached to the fiber optic cable 12.

The source light beam reaches the polarizer location where it is removed from the optical fiber and optically coupled to polarizer 14. Polarizer 14 polarizes the source light beam to provide a polarized light beam having the plurality of spectral components with different wavelengths.

The polarized light beam is then directed to a multiple wave retardation device 18. Multiple wave retardation device 18 may include a plurality of retardation plates. A more detailed explanation of the retarder mechanism will be provided later herein.

The retarded light beam having a plurality of retarded components is then provided to photoelastic transducer 20. Photoelastic transducer 20 then modulates the polarizations of the retarded components of the retarded light beam. These modulations are carried out in accordance with the pressure detected by the photoelastic transducer 20. The degree of modulation for each retarded component varies according to the wavelength of the component.

The modulated light beam is then provided to analyzer 22 which provides an output optical signal containing a plurality of analyzed components corresponding to the spectral components of the source light beam. Each of the analyzed components varies in accordance with the modulation induced by the photoelastic transducer. However, the light intensity modulations of the total analyzed signal have a zero sum and therefore the analyzed signal is effectively unresponsive to the pressure applied to the photoelastic transducer 20.

The analyzed light beam is then injected into fiber optic cable 24 which may include a plurality of fiber optic cables and connectors 26. The output light beam is then directed toward beam splitter 28. Beam splitter 28 divides the output light beam into first portion 30 and second portion 32. First portion 30 is directed to a narrow passband filter 34 which filters out all but one selected component of the analyzed light beam. The selected component is one which varies in accordance with the pressure applied to photoelastic transducer 20. This filtered optical signal is provided to a first photodetector 36 where the light intensity of the one component is detected. An electrical signal is then output from first photodetector 36 to processor 38. This electrical signal will vary in accordance with the pressure applied to photoelastic transducer 20 and in accordance with transmission losses and optical source power fluctuations.

The second portion of the output beam split at beam splitter 28 is provided directly to a second photodetector 40. Since the optical signal provided to photodetector 40 contains all analyzed components of the analyzed light beam, it is relatively unresponsive to the pressure applied to photoelastic transducer 20. Therefore, photodetector 40 outputs an electric signal which varies in accordance with the transmission losses and optical source power fluctuations, but does not vary in accordance with transducer induced variations. Second photodetector 40 outputs this electrical signal to processor 38. Processor 38 then provides an output signal corresponding to a ratio of the first and second electrical signals received from photodetectors 36 and 40. Thus, the ratio of the electrical signals from photodetectors 36 and 40 provides an output signal which is responsive to pressure applied to photoelastic transducer 20, yet is substantially free of transmission losses and optical source power fluctuations.

The principle according to the present invention will now be discussed in greater detail with reference to FIGS. 3-11. The multiple wave retardation technique is based upon two facts. First, if a multiple wave biasing retarder is used in the construction of the photoelastic transducer, different wavelengths of light will be biased differently therein. Ordinary photoelastic sensor design does not use multiple wave bias retardation. Secondly, if a properly selected broadband optical source is used, the different biases of the spectral components of the source light beam will conspire to make the total transducer output vary slowly as a function of initial transducer action even though each of the individual spectral components is varying rapidly over the same range.

Figure 3:
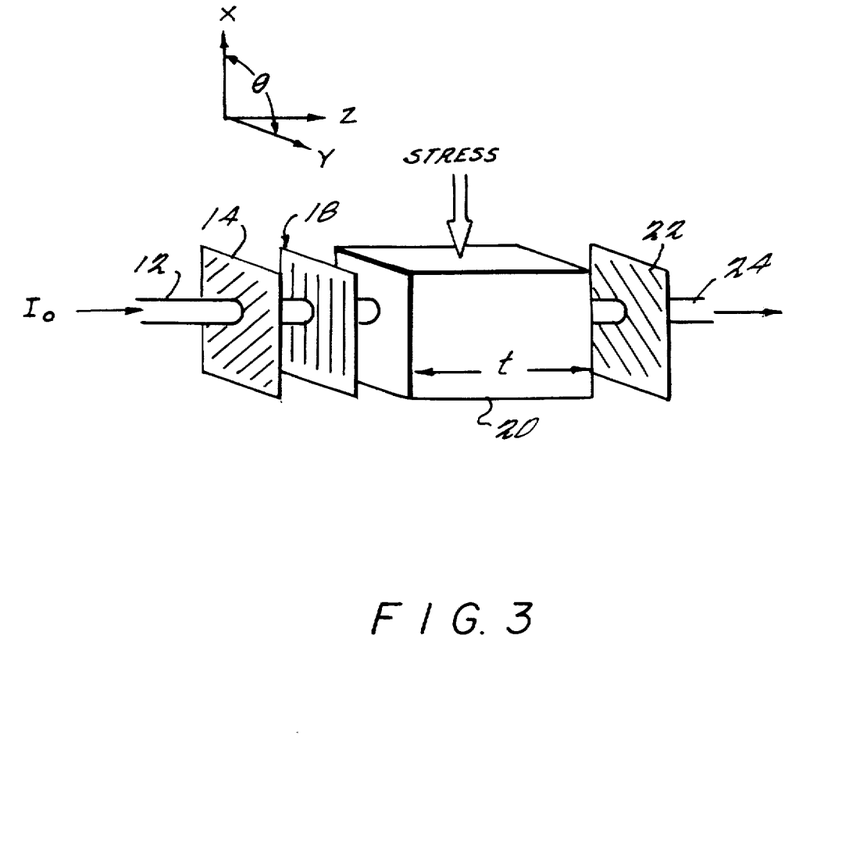
FIG. 3 depicts a perspective view of the polarizer, retarder, photoelastic sensing element, and analyzer of the FIG. 2 embodiment of the present invention.

FIG. 3 is a perspective view depicting detailed features of the polarizer, retarder, photoelastic sensing element, and analyzer. The source light beam having an intensity $I_0$ is provided from fiber optic cable 12. The source light beam is directed to polarizer 14 which has a transmission axis of $+\pi/4$ with respect to the X axis. If the Z axis is defined as the optical axis, the X-Y plane stands orthogonal to the optical axis and is coplanar with polarizer 14. The polarized light beam is then directed to multiple wave retardation device 18.

Retardation device 18 may include a piece of birefringent, uniaxial material in which the ordinary and extraordinary rays travel at different velocities. Thus, one ray is retarded relative to the other. Thus, the retardation plates introduce phase differences in the spectral components in the source light beam. As shown in FIG. 3, the fast axis of retarded plate 18 is parallel to the X axis.

The retarded light beam is then provided to photoelastic transducer 20. This transducer then modulates the polarizations of the spectral components of the retarded light beam in accordance with pressure applied to the photoelastic transducer 20, substantially parallel to the X axis.

The modulated light beam is then passed to analyzer 22 which has a transmission axis at approximately $-\pi/4$ with respect to the X axis. The analyzer provides an analyzed light beam including a plurality of analyzed components which vary in accordance with the pressure applied to photoelastic sensing element 20. In this case, the optical power from the broadband light beam passing through the photosensing element and analyzer 22 have spectral components which are retarded more or less depending upon their wavelengths. There is an averaging out of the effect over various wavelengths so that the total transmitted light intensity of the analyzed light beam does not vary with the retardation induced in the photoelastic transducer 20.

Figure 4:
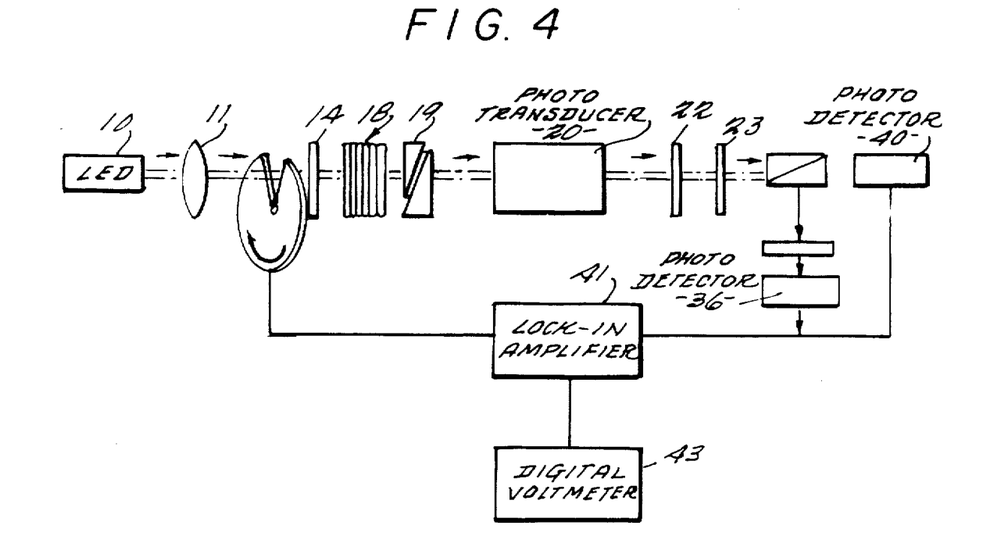
FIG. 4 depicts a second embodiment according to the present invention.

FIG. 4 depicts an alternative embodiment of the present invention in which the broadband optical source 10 is an LED. The LED outputs a light beam which is focused by lens 11 to provide the source light beam. A chopper 13 then chops the source light beam. The chopped source light beam is provided to polarizer 14, and multiple wave retardation plates 18, as in the embodiment of FIG. 2. A compensator 19 is then inserted between multiple wave retardation device 18 and photoelastic transducer 20. The compensator may be a Babinet-Soleil compensator. The compensated light beam is then provided to photoelastic transducer 20 which modulates the light beam according to the pressure applied thereto. The modulated light beam is then directed to analyzer 22, and on to beam splitter 28, filter 34 and photodiodes 36 and 40, as in the embodiment according to FIG. 2.

Photodiodes 36 and 40 are coupled to a lock-in amplifier 41 which in turn controls chopper 13. Lock-in amplifier 41 and chopper 13 are used to counteract the effects of ambient light when using the present invention in a well-lit environment. Lock-in amplifier 41 may be coupled to digital voltmeter 43 to provide the appropriate output signals.

The basic equation of the broadband-multiple wave retardation invention may be defined as follows:

$$I = (I_0/4)[1 - \cos((A\lambda_0 S/\lambda) + (2\pi R/\lambda))]$$

The constant A is a constant for the particular transducer material used in the photoelastic transducer 20 and depends upon the optical path length through the photoelastic transducer. $\lambda_0$ is the reference wavelength in nanometers. The constant R is the retardation value of the retardation device, also in nanometers. The constant S is the stress applied to the photoelectric transducer 20, and is given in metric terms.

Figure 5:
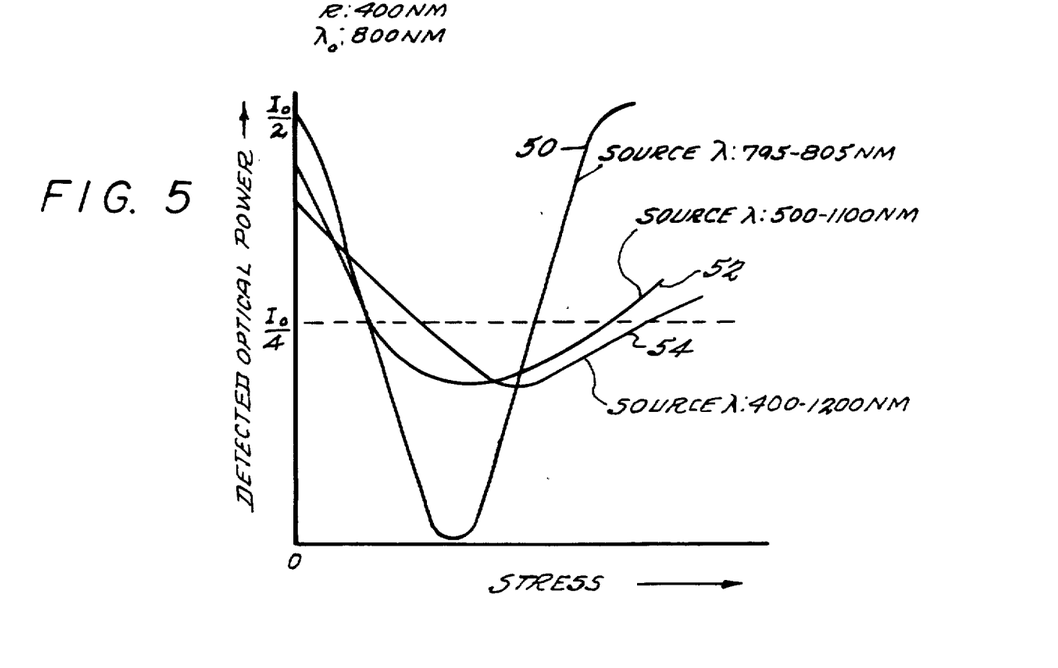
FIG. 5 is a graph depicting the effect of optical source broadening upon the detected optical power in accordance with the present invention.

FIG. 5 depicts the effect on the detected optical power of broadening the bandwidth of the source light beam. In FIG. 5, the retardation value R is set at 400 nanometers, and the reference wavelength $\lambda_0$ is set at 800 nanometers. Line 50 is a graph depicting the detected optical power versus stress for a source light beam having a linewidth of approximately 10 nanometers. It can be seen that the detected optical power varies strongly with the applied stress. Line 52 shows the effect on detected optical power versus stress where the source light beam has a linewidth of approximately 600 nanometers. The detected optical power varies moderately with applied stress. Finally, line 54 shows the variation in detected optical power versus stress for a source light beam having a linewidth of approximately 800 nanometers. In this case, the detected optical power varies more slowly with the applied stress.

Figure 6:
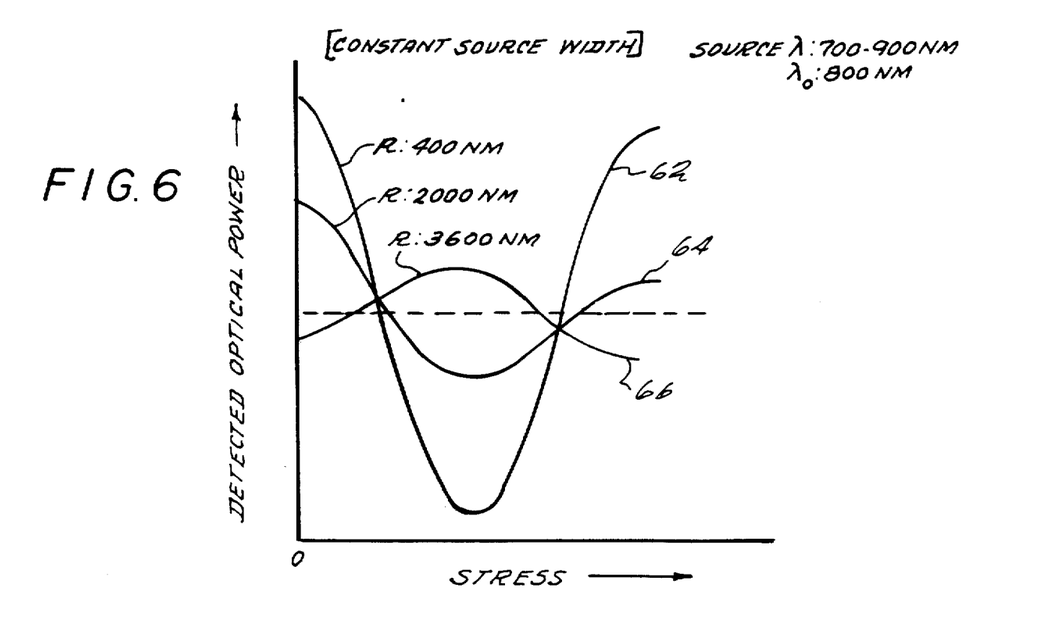
FIG. 6 shows a graph depicting the effect of multiple wave retardation on detected optical power according to the present invention.

In FIG. 6, the effect of multiple wave retardation on the detected optical power is depicted. A source light beam having a linewidth of a constant 200 nanometers is assumed. The reference wavelength $\lambda_0$ is the approximate central wavelength of the broadband optical source, and is approximately 800 nanometers. Line 62 shows that the detected optical power varies greatly with applied stress where the retardation value R equals 400 nanometers. Line 62 shows that the detected optical power varies moderately with applied stress for a retardation value R of 2,000 nanometers. On the other hand, line 66 shows that detected optical power varies only slightly with stress where the retardation value R is 3,600 nanometers.

Figure 7:
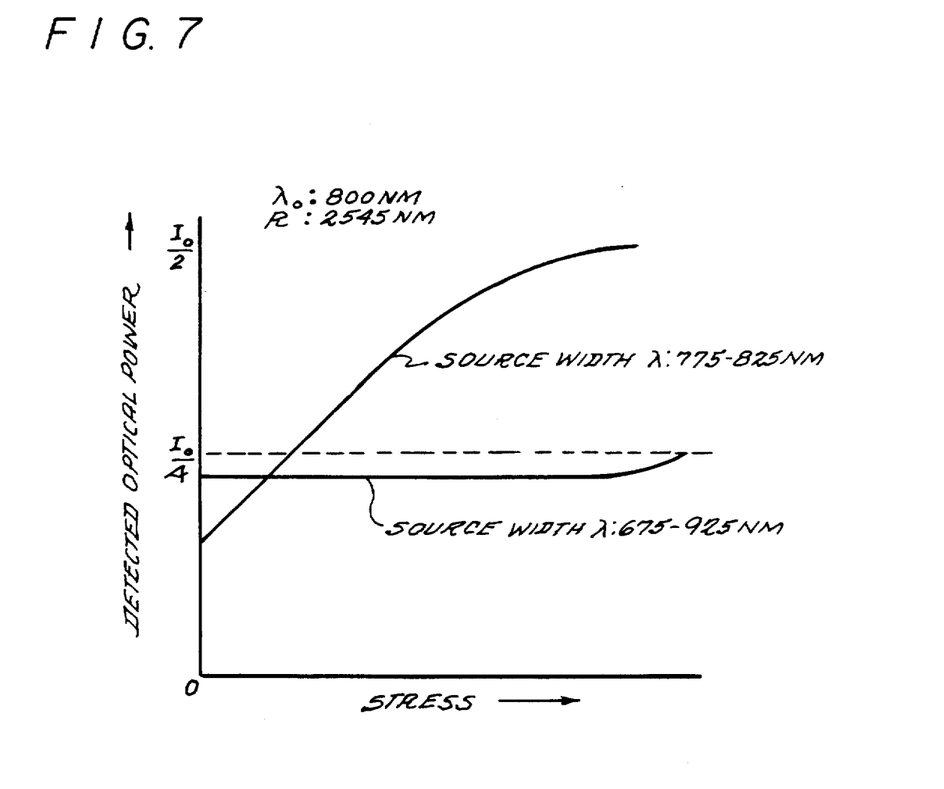
FIG. 7 shows a graph depicting the effect of optimum optical source widening and multiple wave retardation on detected optical power in accordance with the present invention.

FIG. 7 depicts the effect on detected optical power versus stress for an optimal source width and an optimal multiple wave retardation. The source reference wavelength $\lambda_0$ is chosen as 800 nanometers, while the retardation value R is chosen to be 2,545 nanometers. As can be seen, when the source width is only 50 nanometers the detected optical power varies semi-linearly with stress. By the same token, when the source linewidth is approximately 250 nanometers the detected optical power remains relatively unresponsive to increased stress. Therefore, it can be appreciated that by a judicious choice of a source linewidth, and by properly filtering the analyzed light beam emerging from the analyzer, two signals may be obtained which will allow the elimination of fiber optic lead and connector losses in the system. Specially, if the source linewidth chosen as 250 nanometers, and if the analyzed light beam is filtered to a 50 nanometer bandwidth, two detected optical power signals may be obtained which vary and are relatively invariant with the applied stress, respectively. By forming a ratio between these obtained signals, it is possible to eliminate the effects of signal attenuation in the fiber optic cables and couplers and optical source drift.

Figures 8A, 8B:
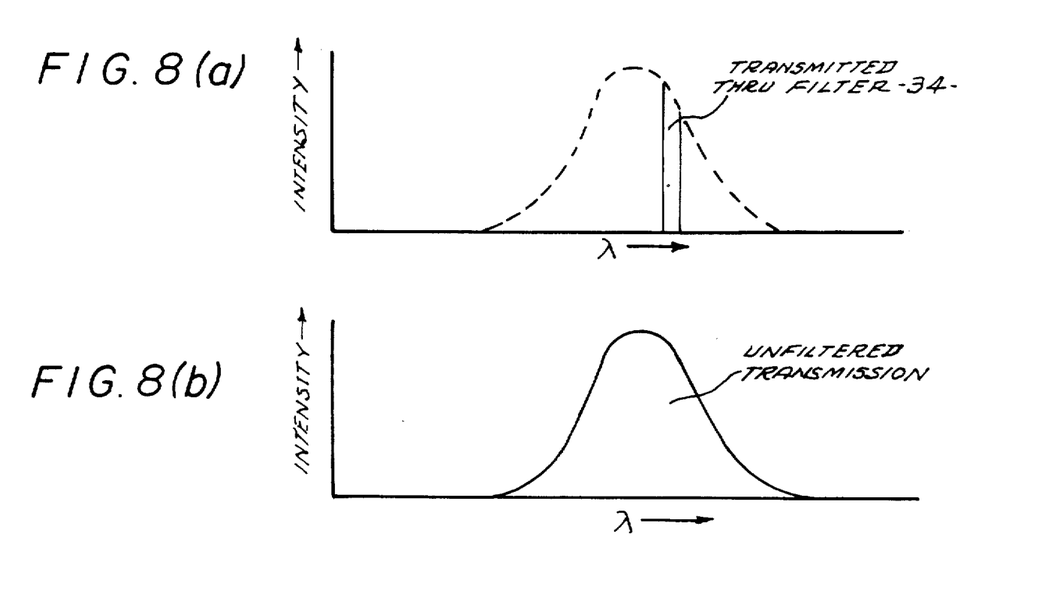
FIGS. 8a and 8b shows two graphs depicting the first and second portions of the split output beam showing a spectral component which varies according to the applied phenomenon, and a plurality of spectral components which, as a whole, are relatively unresponsive to the applied phenomenon.

FIGS. 8a and 8b are two graphs of the spectral distributions of the two optical signals as they strike the two photodetectors. In FIG. 8a, only a narrow band of spectral components is transmitted through the narrow passband filter 34. Where the bandwidth of this filtered signal is, for example, 50 nanometers, the detected optical power will vary with stress as was shown in FIG. 7. FIG. 8b shows the optical signal which is not filtered and thus contains a wide spectral band of unfiltered components. Where the source linewidth is, for example, 200 nanometers, the total detected optical power will remain relatively insensitive to variations in stress, as was shown in FIG. 7.

Figure 9A:
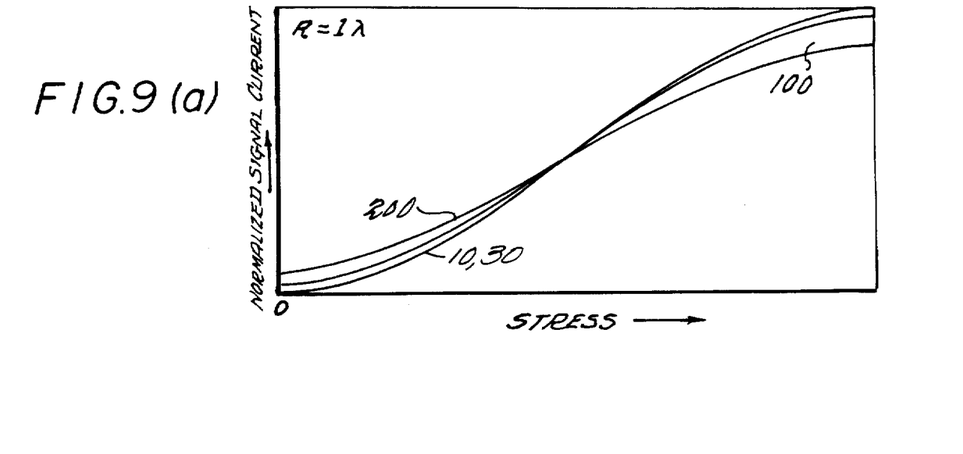
FIGS. 9a, 9b, and 9c are three graphs depicting the advantages derived from additional multiple wave retardation of the source light beam.
Figure 9B:
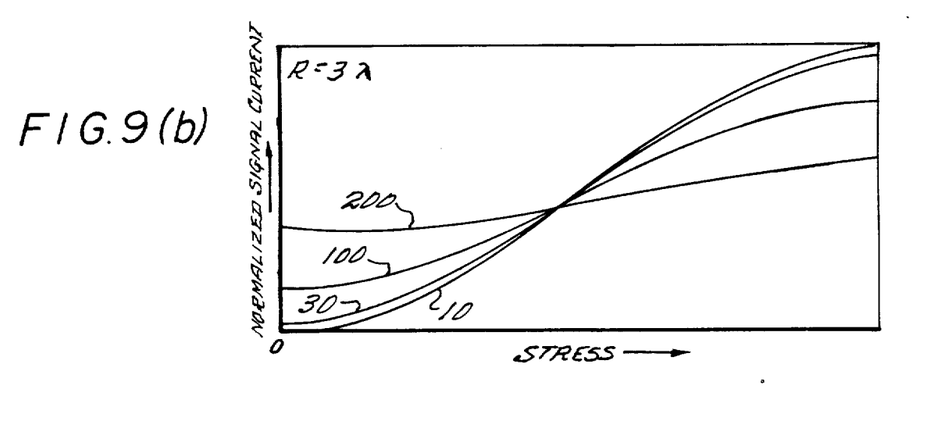
Figure 9C:
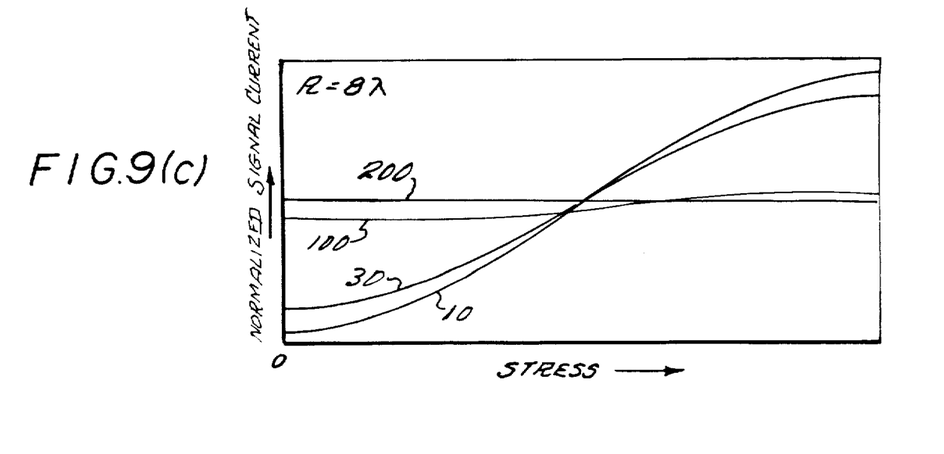

In order to ascertain the practical limits of the source linewidth, and of the bandwidth of the filtered optical signal, computer modeling was performed varying the retardation values and the linewidths of the optical source and the filtered optical signal. The results of the computer modeling are depicted in FIGS. 9a, 9b, and 9c. FIG. 9a indicates that for a full wave retardation ($R=1\lambda$) of the center source wavelength, broadening the source width reduces the effective range of response of the signal to applied stress. Thus, the optical source linewidth of 200 nanometers would be barely distinguishable from a filtered optical signal having a bandwidth of 10 or 30 nanometers. Likewise, where the optical source linewidth is 100 nanometers, it would be barely distinguishable from a filtered signal having a bandwidth of 10 or 30 nanometers.

However, if multiple wave retardation of $R=3\lambda$ is introduced into the optical system, the response curves begin to vary significantly, as shown in FIG. 9b. In FIG. 9b, the 200 nanometer curve flattens appreciably. It can be seen that a filtered optical signal with a bandwidth of 10 or 30 nanometers would be moderately distinguishable from the unfiltered signal when the source linewidth is chosen as 100 or 200 nanometers.

Finally, if the multiple wave retardation in the system is increased to $R=8\lambda$, the 200 nanometer wide source exhibits a flat response, while the 30 and 10 nanometer curves still exhibit considerable variation with applied stress. Also, the 100 nanometer curve shows considerable flattening and would also be easily distinguishable from a filtered signal having either a 10 or a 30 nanometer bandwidth.

This computer modeling teaches that for the presently preferred embodiment the source linewidth should be greater than or equal to 100 nanometers, while the passband of filter 34 should be less than or equal to 30 nanometers. Of course, these figures may be varied as photodetector sensitivity increases or as the photoelectric transducer sensitivity is heightened. The teachings of this invention should not be thought of as being limited by the particular linewidths of the optical source or the filtered optical signal.

In order to qualitatively verify the results of the computer modeling, an experiment was performed using the apparatus shown in FIG. 4. Light from an Augat 698-ARJ-E12 LED was collimated, chopped, and then passed through a Polaroid (TM) HR polarizing filter. The light beam was then transmitted through a number of Polaroid (TM) retardation plates, a Babinet-Soleil compensator, a piece of PSM-4 polyurethane photoelastic material, and a second polarizing filter. The light was finally detected by an RCA C30809 photodiode lock-in amplifier combination. Depending on the measurement, a 10 nanometer passband optical interference filter could be placed in front of the photodetector.

The output from the Augat LED was centered at 820 nanometers and its full width at the 1/e points was 50 nanometers. The experimental configuration of FIG. 4 was used (without the interference filter) to determine the system response to loading with various values of multiple wave retardation in the system. The photoelastic transducer was subjected to incremental loading along the X axis. First, the retardation value of the multiple wave retardation device 18 was varied. The results of the experiment generally confirm the relationships depicted in FIGS. 9a, 9b, and 9c. Specifically, as the retardation value was increased, the response curve became flatter. Next, the source width of the LED was varied while holding the retardation value constant. Again, the results confirmed the relationships depicted in FIGS. 9a, 9b, and 9c. Specifically, a narrow bandwidth optical signal varied greatly with applied stress, while a broader band optical signal showed a flatter response curve to applied stress. Therefore, a judicious choice of optical source linewidth spectral filter passband, and retardation values can provide a system in which detected optical power for a narrow spectral component varies greatly with applied stress, while detected optical power of the broadband source signal remains relatively unresponsive to applied stress. This relationship is depicted in FIG. 10.

Figure 10:
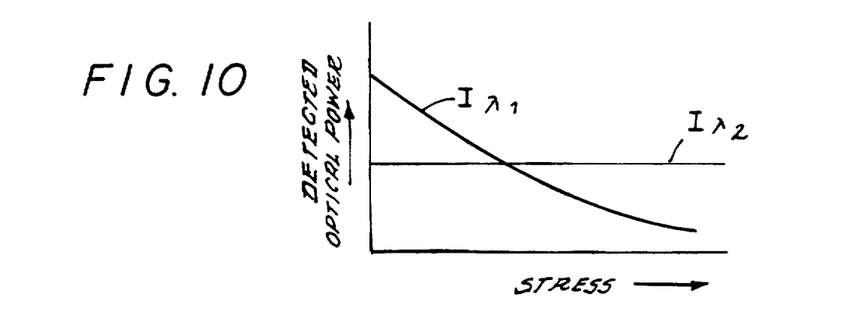
FIG. 10 is a graph showing the detected output power of the spectral component which varies according to the detected phenomenon, and the detected output power of the plurality of analyzed components which do not vary in accordance with the detected phenomenon.

FIG. 10 shows that the detected optical power of the narrow band, filtered signal having wavelength $\lambda_1$ varies significantly with stress. On the other hand, the detected optical power of the broadband source signal centered at wavelength $\lambda_2$ remains relatively invariant with applied stress.

Figure 11:
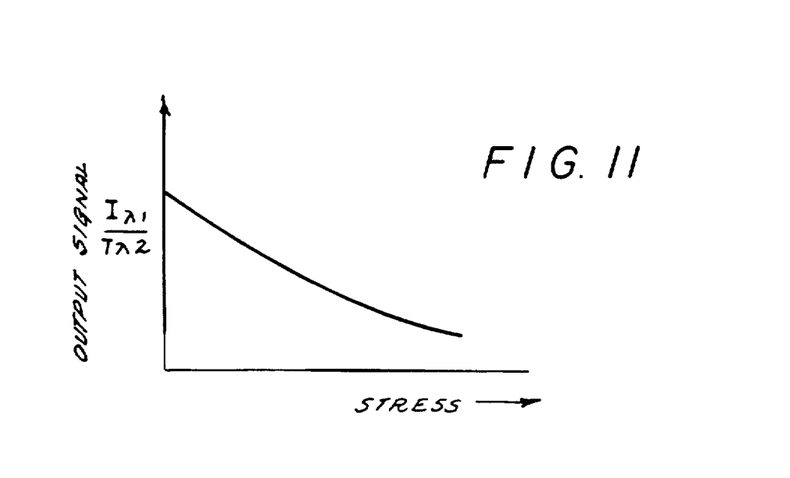
FIG. 11 shows the output signal of the processing device which is responsive to the detected phenomenon, but is independent of lead/coupler losses and power fluctuations in the optical source.

The relationship of FIG. 10 is used in FIG. 11 to provide an output signal from the processor 38. Where a ratio is formed of the detected optical signals, for example $I_{\lambda 1}/I_{\lambda 2}$, the ratio will vary in accordance with the stress applied to photoelastic transducer 20. However, since both the signals $I_{\lambda 1}$ and $I_{\lambda 2}$ contain components which vary in accordance with the fiber optic cable and connector losses, and in accordance with power fluctuations of the optical source, the ratio signal will cancel out these effects. Thus, the ratio signal will vary only with applied stress and not with power fluctuations or transmission losses in the fiber optic system. Thus, a much more precise measurement of the pressure applied to phototransducer 20 may be obtained.

Thus, the use of selected spectral components of a broadband optical source with a fiber optic transducer mechanism that acts on those components differently offers the possibility of fiber optic sensors that operate independently of optical losses to and from the transducer location, and drift in the optical source. Thus, the present invention provides a solution to the practical problems experienced in applying phototransducers to a wide variety of sensor applications.

Thus, what has been described is an inexpensive yet precise apparatus and method for detecting an applied phenomenon with a phototransducer which effectively eliminates signal losses due to fiber optic transmission losses and optical source power fluctuations.

While the invention has been described in connection with what is presently considered to be the most practical and preferred embodiments, it is to be understood that the invention is not limited to the disclosed embodiment but, on the contrary, is intended to cover various modifications and equivalent arrangements included within the spirit and scope of the appended claims.

I claim:

1. Optical sensor apparatus, comprising:
   optical source means for providing a broadband source light beam including a plurality of spectral components, each spectral component having a different wavelength;
   polarizer means for receiving said source light beam and polarizing it to provide a polarized light beam including said plurality of spectral components;
   multiple wave retardation means for receiving said polarized light beam and retarding said plurality of components to provide a retarded light beam having a plurality of retarded components;
   optical transducer means for (a) receiving said retarded light beam, (b) modulating said retarded components in accordance with an externally applied condition, each retarded component being modulated by an amount corresponding to the wavelength associated with each retarded component, and (c) providing an output light beam having a plurality of modulated components;
   analyzer means for receiving said output light beam and providing an analyzed light beam having a plurality of analyzed components corresponding to said plurality of modulated components, a total light intensity of said analyzed light beam remaining effectively unresponsive to said externally applied condition;
   filter means for (a) receiving said analyzed light beam (b) providing a first optical signal having only one portion of said analyzed components, said one portion including an analyzed component which varies according to said externally applied condition, and (c) providing a second optical signal including said plurality of analyzed components;
   photodetector means for (a) receiving said first and second optical signals, (b) converting said optical signals into electrical signals, (c) providing a first electrical signal corresponding to an intensity of said first optical signal, and (d) providing a second electrical signal corresponding to an intensity of said second optical signal; and
   processing means for receiving said first and second electrical signals and providing an output signal corresponding to a ratio of said first and second electrical signals.

2. Apparatus according to claim 1 further including:
   first light guiding means for guiding said source light beam from said optical source means to said polarizer means; and
   second light guiding means for guiding said analyzed light beam from said analyzer means to said filter means.

3. Apparatus according to claim 2 wherein said first and second light guiding means include fiber optical cables.

4. Apparatus according to claim 1 wherein said filter means include:
   beam splitter means for receiving said analyzed light beam and splitting it into first and second portions, each portion including said analyzed components said second portion comprising said second optical signal; and
   narrow passband filter means for (a) receiving said first portion from said beam splitter means, (b) passing said one portion of said analyzed components while substantially blocking remaining analyzed components, and (c) providing said first optical signal.

5. Apparatus according to claim 4 wherein said photodetector means includes:
   first photodetector means for receiving said first optical signal from said narrow passband filter means, and for providing said first electrical signal; and
   second photodetector means for receiving said second optical signal from said beam splitter means, and for providing said second electrical signal.

6. Apparatus according to claim 1 wherein said optical transducer means includes a photoelastic optical transducer.

7. Apparatus according to claim 6 wherein said photoelastic optical transducer modulates said retarded components in accordance with externally applied pressure.

8. Apparatus according to claim 7 wherein said polarizer means and said analyzer means are coaxial and are cross-polarized with respect to each other, and wherein said photoelastic optical transducer is disposed to be responsive to pressure applied at substantially 45° with respect to transmission axes of said polarizer means and said analyzer means.

9. Apparatus according to claim 1 wherein said optical source means provides said source light beam having a wavelength bandwidth of effectively greater than 100 nanometers.

10. Apparatus according to claim 1 wherein said multiple wave retardation means has a retardation factor R which is effectively greater than 1 $\lambda$, where $\lambda$ is the approximate center wavelength of said broadband source light beam.

11. Optical sensor apparatus, comprising:
    light source means for providing a source light beam having a plurality of spectral components, each spectral component having a different wavelength;
    polarization-multiple wavelength retardation-transducer means for (a) receiving said source light beam, (b) polarizing said source light beam to provide a polarized light beam having said plurality of spectral components, (c) retarding said plurality of spectral components in said polarized light beam to provide a retarded light beam having a plurality of retarded components, (d) modulating said retarded light beam in accordance with externally applied pressure to provide a modulated light beam having a plurality of modulated components corresponding to said plurality of retarded components, and (e) analyzing said modulated light beam to provide an output light beam having a total light intensity which is effectively unresponsive to said externally applied pressure, said output light beam having said plurality of modulated components;
    filter means for (a) receiving said output light beam, (b) providing a first optical signal having only one portion of said plurality of modulated components, said one portion varying in accordance with said externally applied pressure, (c) providing a second optical signal corresponding to said unresponsive total light intensity;
    photodetector means for receiving said first and second optical signals and providing first and second electrical signals corresponding to light intensities of said first and second optical signals, respectively; and processing means for receiving said first and second electrical signals and providing an output signal corresponding to a ratio of said first and second electrical signals.

12. Apparatus according to claim 11 wherein said light source means provides said source light beam with a wavelength bandwidth effectively greater than 100 nanometers, and wherein said filter means provides said first optical signal with a wavelength bandwidth of effectively less than 50 nanometers.

13. Apparatus according to claim 11 wherein said polarization-multiple wavelength retardation-transducer means includes:
   polarizer means for polarizing said source light beam;
   multiple wavelength retardation means for retarding said plurality of spectral components;
   photoelastic transducer means for modulating said retarded light beam; and
   analyzer means for analyzing said modulated light beam.

14. Apparatus according to claim 13 wherein said multiple wavelength retardation means includes a plurality of wavelength retardation plates.

15. Apparatus according to claim 13 wherein an optical axis is defined by paths of projection of said source light beam, said polarized light beam, said modulated light beam, and said output light beam, and wherein an X-Y plane having X and Y axes is defined orthogonal to said optical axis, and wherein:
   said polarizer means has a transmission axis substantially $+\pi/4$ with respect to said X axis;
   said photoelastic transducer means is responsive to pressure applied along said X axis; and
   said analyzer means has a transmission axis substantially $-\pi/4$ with respect to said X axis.

16. Apparatus according to claim 13 further comprising:
   a chopper optically coupled between said light source means and said polarizer means; and
   a compensator optically coupled between said multiple wavelength retardation means and said photoelastic transducer means.

17. Apparatus according to claim 11 further including:
   first fiber optic cable means for transmitting said source light beam from said light source means to said polarization-multiple wavelength retardation-transducer means; and
   second fiber optic cable means for transmitting said output light beam from said polarization-multiple wavelength retardation-transducer means to said filter means.

18. Apparatus according to claim 14 wherein said filter means includes:
   beam splitter means for receiving said output light beam and splitting it into first and second portions, each portion including said plurality of modulated components, said second portion corresponding to said second optical signal; and
   narrow passband filter means for (a) receiving said first portion from said beam splitter means, (b) transmitting said one portion of said plurality of modulated components while substantially blocking remaining portions of said plurality of modulated components, and (c) providing said first optical signal.

19. Apparatus according to claim 11 wherein said photodetector means includes:
   first photodetector means for receiving said first optical signal and providing said first electrical signal; and
   second photodetector means for receiving said second optical signal and providing said second electrical signal.

20. A method of sensing comprising the steps of:
   providing a source light beam having a plurality of spectral components, each spectral component having a different wavelength;
   polarizing said source light beam to provide a polarized light beam having said plurality of spectral components;
   retarding said polarized light beam to provide a retarded light beam having a plurality of retarded components corresponding to said plurality of spectral components;
   modulating said retarded light beam in accordance with an externally applied condition to provide a modulated light beam having a plurality of modulated components corresponding to said plurality of retarded components, each said modulated component being modulated by an amount corresponding to the wavelength associated with each retarded component;
   analyzing said modulated light beam to provide an analyzed light beam having a plurality of analyzed components corresponding to said modulated components, a total light intensity of said analyzed light beam being substantially unresponsive to said externally applied condition;
   filtering said analyzed light beam to provide (a) a first optical signal having only one portion of said analyzed components, said one portion including an analyzed component which varies in response to said externally applied condition, and (b) a second optical signal including said plurality of analyzed components, a sum of said plurality of analyzed components being substantially unresponsive to said externally applied condition;
   detecting said first and second optical signals and providing (a) a first electrical signal corresponding to a light intensity of said first optical signal, and (b) a second electrical signal corresponding to a light intensity of said second optical signal; and
   processing said first and second electrical signals to provide an output signal corresponding to a ratio of said first and second optical signals.

21. A method according to claim 20 wherein said step of providing a source light beam includes the step of providing a source light beam having a wavelength bandwidth effectively greater than 100 nanometers, and wherein said filtering step includes the step of filtering said analyzed light beam to provide said first optical signal having a wavelength bandwidth of effectively less than 50 nanometers.

22. A method according to claim 20 wherein said filtering step includes the steps of:
   splitting said analyzed light beam to provide first and second beam portions, said second beam portion corresponding to said second optical signal; and
   filtering said first beam portion to transmit said one portion of said analyzed components while substantially blocking remaining analyzed components to provide said first optical signal.

23. A method according to claim 20 wherein said detecting step includes the steps of:

detecting, with a first photodetector, said first optical signal and providing said first electrical signal; and detecting, with a second photodetector, said second optical signal and providing said second electrical signal.

24. A method according to claim 20 including the further steps of:

transmitting, with a first fiber optic cable, said source light beam; and transmitting with a second fiber optic cable, said analyzed light beam.

25. A method according to claim 20 wherein said step of modulating includes the step of modulating said retarded light beam in accordance with externally applied pressure.

26. A method according to claim 20 wherein said step of retarding includes the step of retarding said polarized light beam with a multiple wavelength retarder having a retardation factor R which is effectively greater than $1\lambda$, where $\lambda$ is the approximate center wavelength of said source light beam.

27. A method of optically sensing pressure, comprising the steps of:

generating a broadband source light beam having a plurality of spectral components, each spectral component having a different wavelength;

transmitting, with at least a first fiber optic cable, said source light beam;

polarizing the transmitted source light beam to provide a polarized light beam having said plurality of spectral components;

retarding said polarized light beam to provide a retarded light beam having a plurality of retarded components corresponding to said plurality of spectral components, each said retarded component having a different wavelength;

detecting, with a photoelastic transducer, said pressure;

modulating, with said transducer, said retarded light beam to provide a modulated light beam having a plurality of modulated components corresponding to said plurality of retarded components;

analyzing said modulated light beam to provide an analyzed light beam having a plurality of analyzed components corresponding to said plurality of modulated components, said analyzed light beam having a total light intensity which remains substantially unresponsive to variations in said pressure;

transmitting, with at least a second fiber optic cable, said analyzed light beam;

splitting the transmitted analyzed light beam into first and second portions, each portion having said plurality of analyzed components, said second portion comprising a first optical signal;

filtering said first portion to pass only one portion of said analyzed components while substantially blocking remaining analyzed components, said one portion being responsive to variations in said pressure and comprising a second optical signal;

detecting, with a first photodetector, said first optical signal and providing a first electrical signal corresponding thereto;

detecting, with a second photodetector, said second optical signal and providing a second electrical signal corresponding thereto; and processing said first and second electrical signals to provide an output signal corresponding to a ratio of said first and second electrical signals.

* * * * *

UNITED STATES PATENT AND TRADEMARK OFFICE
CERTIFICATE OF CORRECTION

PATENT NO. : 4,712,004

DATED : December 8, 1987

INVENTOR(S) : SPILLMAN, (W.B.) JR

It is certified that error appears in the above-identified patent and that said Letters Patent is hereby corrected as shown below:

Column 1, Line 26

"pheomenon" should be --phenomenon--

Column 1, Line 27

"restrictng" should be --restricting--.

Column 8, line 64

"linewidth chosen" should be -- linewidth is chosen --.

Signed and Sealed this

Twenty-first Day of June, 1988

Attest:

DONALD J. QUIGG

Attesting Officer      Commissioner of Patents and Trademarks